(No Model.) 4 Sheets—Sheet 1.

J. PROEGER.
MOLD FOR MANUFACTURING GLASSWARE.

No. 582,950. Patented May 18, 1897.

Witnesses
Chas. J. Farrar.
Robert C. Totten.

Inventor
Julius Proeger
By Kay & Totten
Attorneys (No Model.) 4 Sheets—Sheet 2.
J. PROEGER.
MOLD FOR MANUFACTURING GLASSWARE.

No. 582,950. Patented May 18, 1897.

Witnesses.
C. J. Farrar.

Inventor.
Julius Proeger
By Kay & Totten
Attorneys.

(No Model.) 4 Sheets—Sheet 3.
J. PROEGER.
MOLD FOR MANUFACTURING GLASSWARE.
No. 582,950. Patented May 18, 1897.
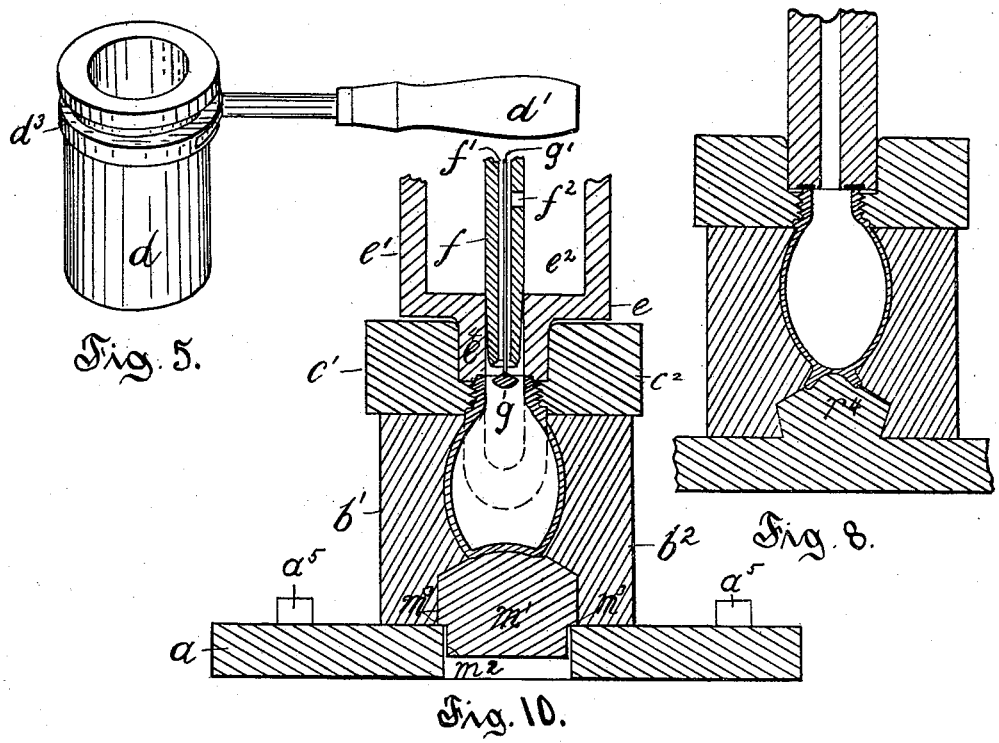
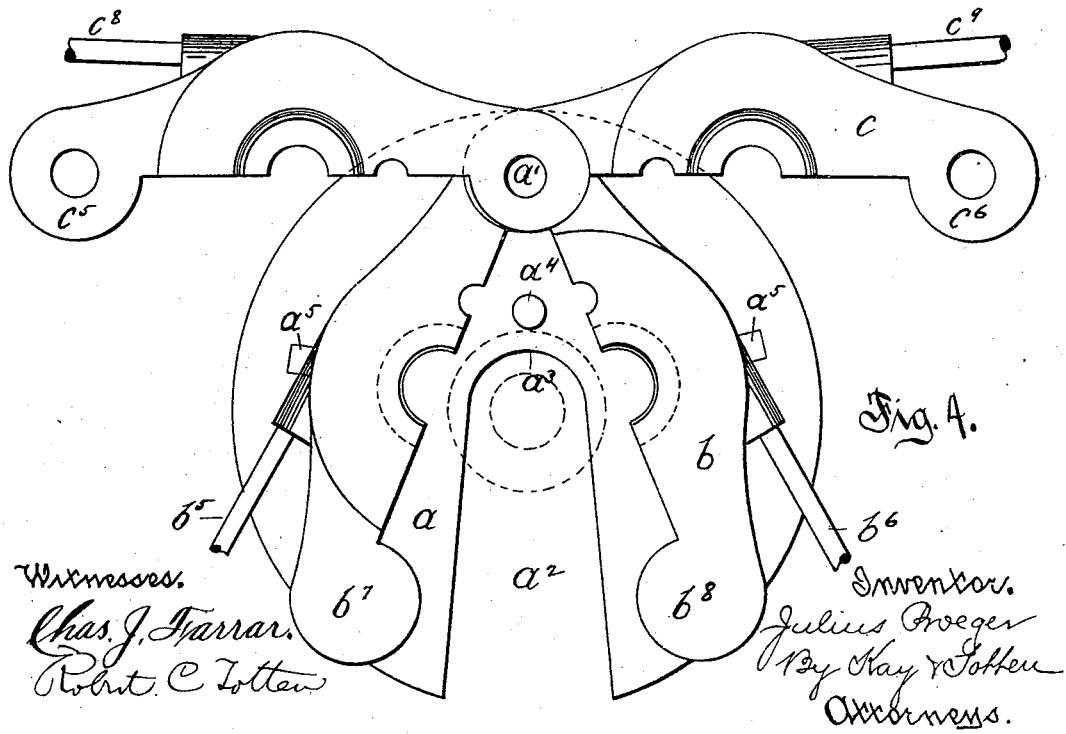

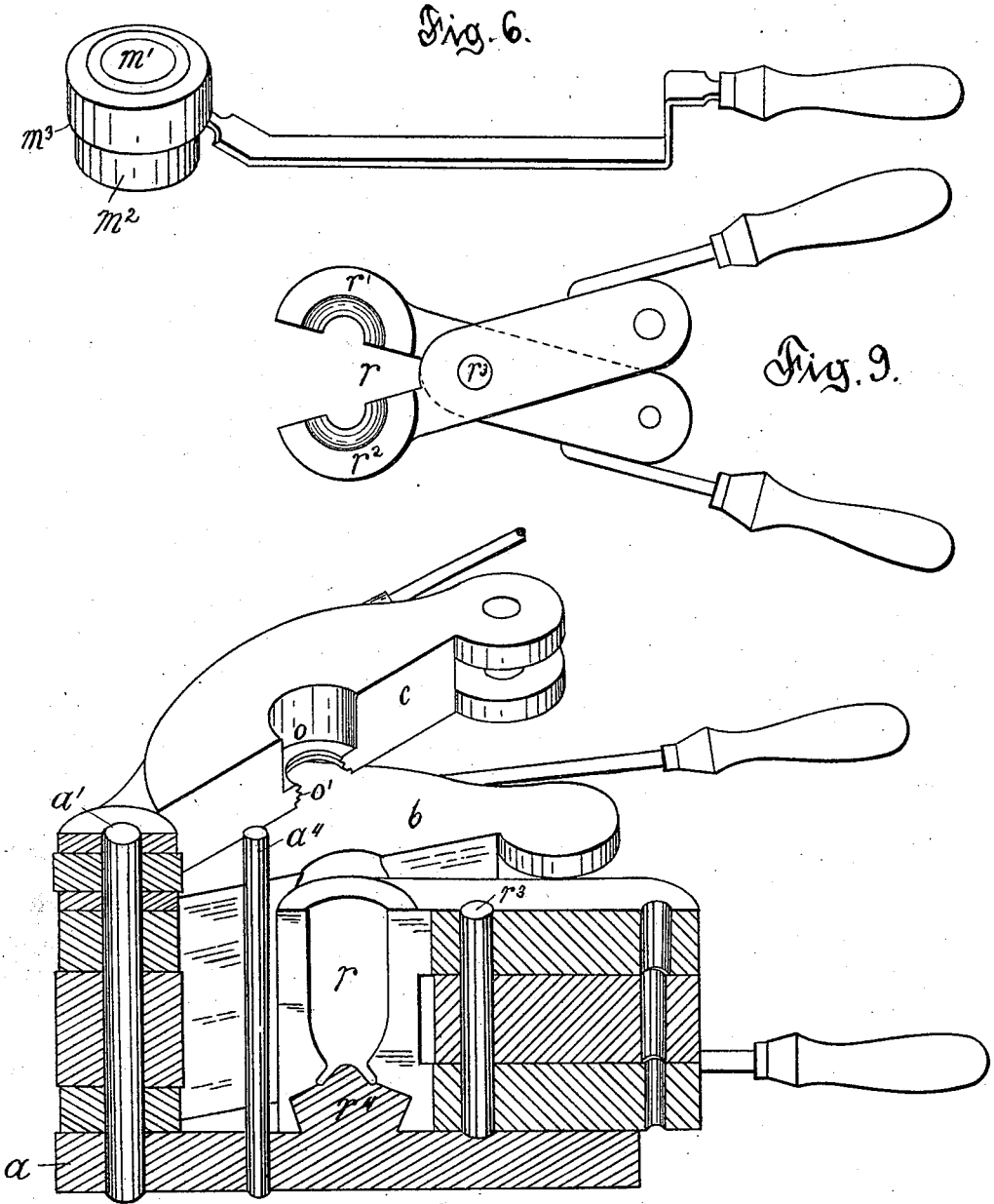

UNITED STATES PATENT OFFICE.

JULIUS PROEGER, OF GREENSBURG, PENNSYLVANIA.

MOLD FOR MANUFACTURING GLASSWARE.

SPECIFICATION forming part of Letters Patent No. 582,950, dated May 18, 1897.

Application filed July 24, 1895. Serial No. 556,981. (No model.)

*To all whom it may concern:*

Be it known that I, JULIUS PROEGER, a resident of Greensburg, in the county of Westmoreland and State of Pennsylvania, have invented a new and useful Improvement in Molds for the Manufacture of Glassware; and I do hereby declare the following to be a full, clear, and exact description thereof.

My invention relates to the manufacture of glassware, one of its objects being to provide for the pressing of articles having small mouths in such way that the glass can be easily inserted and measured in the press mold or matrix without the necessity of feeding it through any small opening where it could not well be measured except by very skilled workmen.

It also has for its object the making of such articles by combined pressing and blowing in such way that the operation takes place within the same general mold, the press-blank being formed within the space occupied by the blow-mold section, which is then closed around it, so that the operation can be rapidly accomplished, and the apparatus is convenient of operation.

To these ends my invention consists, generally stated, in certain improvements in the molding apparatus, comprising an upper press-mold section, which is suitably supported; a removable press-matrix adapted to be passed horizontally under the upper section and supported in position for the pressing operation, but entirely independent of the upper section; a base-plate having a center opening through which the press-matrix may drop, and a blow-mold section swinging under the upper section so as to close around the blank, the preferred construction having the blow-mold section mounted on the base-plate and the upper press-mold section mounted above and supported on the blow-mold section, both these parts being hinged and centered on the same vertical shaft.

To enable others skilled in the art to make and use my invention, I will describe the same by referring to the accompanying drawings, in which—

Figure 1:
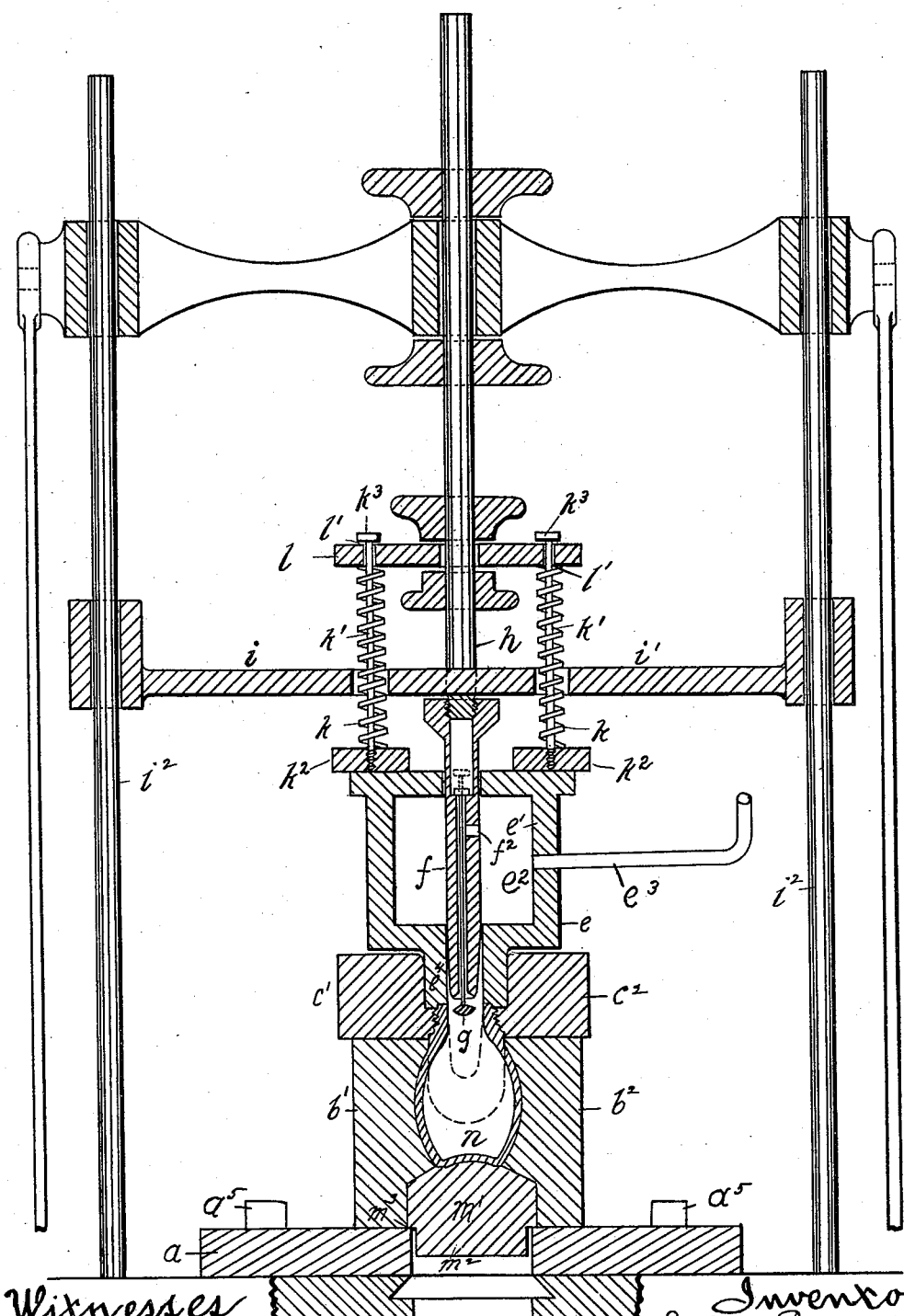
Figure 2:
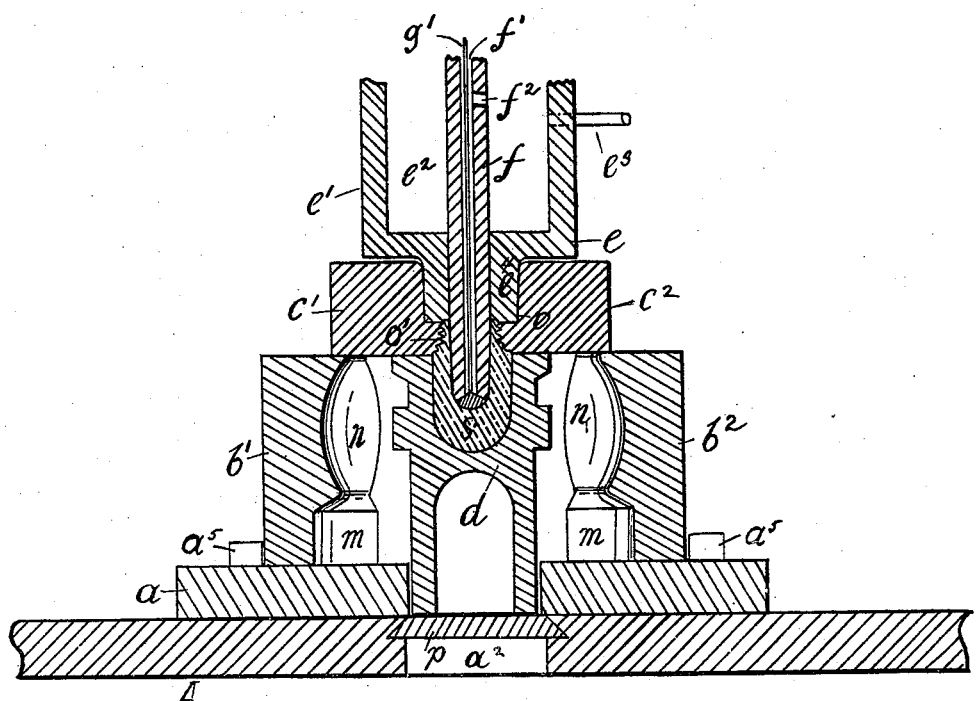
Figure 3:
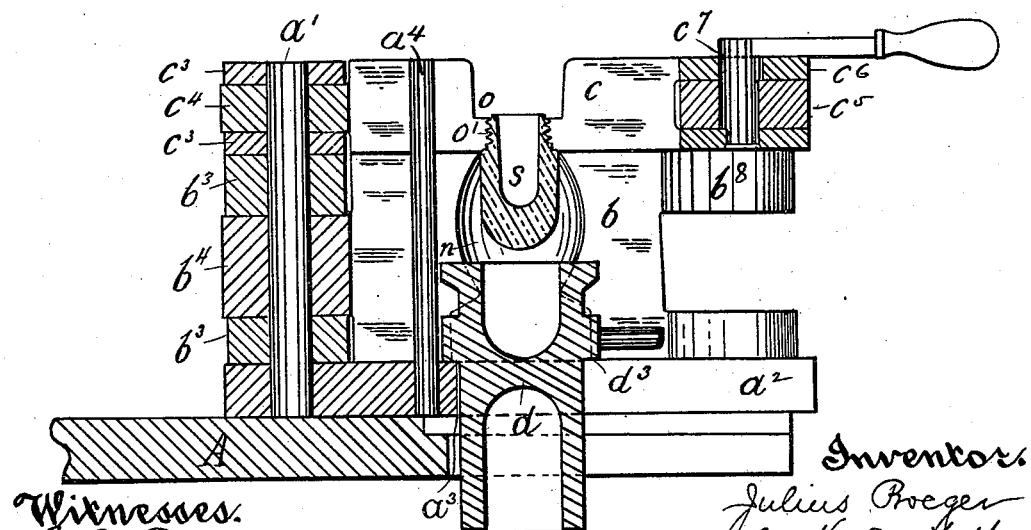

Figure 1 is a vertical sectional elevation of the apparatus. Fig. 2 is an enlarged central cross-section showing the mold parts in position for pressing. Fig. 3 is a longitudinal section at right angles thereto, showing the mold parts after the pressing operation and the withdrawal of the press-matrix. Fig. 4 is a plan view showing the upper press-mold section and the blow-mold section open and showing the base-plate below the same. Fig. 5 is a view of the removable press-matrix. Fig. 6 is a view of the removable base-block to the blow-mold section. Fig. 7 is a perspective sectional view of a mold with another form of press-matrix for producing pressed articles of irregular shape. Fig. 8 is a cross-section of such mold, showing the article blown therein. Fig. 9 is a plan view of the partible press-matrix forming part of such mold, and Fig. 10 is a cross-section showing the blow-mold closed around the blank.

Like letters of reference indicate like parts in each of the figures.

My invention is more particularly useful in connection with the formation of small combined pressed and blown articles, such as salt-cellars, which have a very narrow neck and an enlarged body portion below the same. It has heretofore been found practically impossible to form these articles by a combined pressing and blowing operation, the custom being to form them entirely by blowing, which required the subsequent breaking off and grinding of the tops thereof, leaving the tops rough and imperfect and adding to the cost. In forming these articles I employ the apparatus illustrated in the several figures, the molding apparatus being formed of the base-plate $a$, which rests upon the table A, the blow-mold section $b$, which is mounted thereon on the shaft or pintle $a'$ and above the same, the upper press-mold section $c$, which is mounted upon the said shaft and is supported by the blow-mold section $b$, the parts being thus assembled together and remaining in proper relative positions to each other during the formation of the article. In addition to the above I employ the removable press-matrix $d$, the mold-ring $e$, and the plunger $f$, passing through the same. The mold-ring $e$ forms the base of the box $e'$, through which the said plunger $f$ passes. An air-chamber $e^2$ surrounds the plunger $f$, and air is admitted thereto by the pipe $e^3$. This pipe $e^3$ may be in communication with any suitable source of supply. The plunger $f$ has the passage $f'$ extending through it, and within said passage is the stem $g'$ of the valve $g$. The stem $g'$ has the head $g^2$, which regulates the movement of said stem. The passage $f''$ of the plunger $f$ is placed in communication with the air-chamber $e^2$ by means of the port $f^2$. The plunger $f$ is secured to the rod $h$, which is secured to the ordinary cross-heads $i$ $i'$, sliding on the standards $i^2$, and raised and lowered in the ordinary manner. The mold-ring $e$ is held down by the springs $k$, said springs encircling the rods $k'$. These rods $k'$ are secured to the ring $k^2$, which in turn is secured to the box $e'$. The plate $l$ is mounted on the rod $h$, and said plate has openings $l'$, through which the rods $k'$ pass. The rods $k'$ have the heads $k^3$.

The base-plate $a$ has extended in from one side thereof the opening $a^2$, which extends beyond the center thereof, and the inner end $a^3$, which is curved concentric with the center of the mold, and therefore serves as a centering means both for the press-matrix $d$ and the base-block $m'$ of the blow-mold section. The base-plate $a$ has also the centering-pin $a^4$, with which the blow-mold section $b$ and upper press-mold section or collar $c$ engage, so as to hold said parts in proper line with relation to each other, recesses being formed in each such mold part for this purpose. The base-plate has also suitable stop-lugs $a^5$ to limit the opening of the blow-mold section $b$. The blow-mold section $b$ rests directly upon the base-plate, and it is formed in two sections $b'$ $b^2$, the hinges $b^3$ $b^4$ of which fit around the hinged post or pintle $a'$, above referred to. It has also the handles $b^5$ $b^6$, by which it is operated, and at the front end of it has the guide-lugs $b^7$ $b^8$, which engage with each other horizontally to bring the mold parts into proper line and through which any suitable locking-pin may extend, though for general purposes the mold may be held closed by the handles during the blowing operation. The blow-mold has the blowing-cavity $n$, formed one-half in each mold-section $b'$ $b^2$, and below the same the recess $m$, in which the base-block $m'$ fits, this base-block being inserted horizontally through the side opening $a^2$ of the base-plate $a$ and having in the lower part thereof the circular guide portion $m^2$, which fits the curved end $a^3$ of the side opening $a^2$, and above such guide portion $m^2$ it is enlarged so as to form an annular should $m^3$, which rests upon the top face of the base-plate, the block $m'$ being thus brought to central position by the guide portion $m^2$ and supported against downward movement by the annular shoulder $m^3$, resting on the top of the base-plate. When the blow-mold section is closed together, the upper part of this block $m'$ is inclosed in the cavity $m$ below the blowing-cavity $n$.

The upper press-mold section or collar $c$ is formed in two sections $c'$ $c^2$, having the hinges $c^3$ $c^4$ fitting around the pintle $a'$ and having the locking guide-lugs $c^5$ $c^6$ at the front ends thereof, which are locked by means of the regular eccentric-pin $c^7$, which serves to hold the press-collar closed during the pressing and blowing operations. The press-collar has also the handles $c^8$ $c^9$, one on each section, for operating the two parts thereof. The press-collar has a recess $o$ to receive the depending portion $e^4$ of the plunger-ring $e$, and below the same the molding portion $o'$, the upper part of which is shown as shaped to mold a screw-thread, while the lower part is shaped to mold the upper shoulder of the article of larger diameter than the screw-thread, the ring-cavity $o$ and mold-face $o'$ being formed one-half in each section of the press-collar. The depending neck $e^4$ of the plunger-ring $e$, when it enters the cavity $o$, closes the upper part of the press-mold, which is formed of the upper press-mold section or collar $c$ and the removable press-matrix $d$. The plunger-ring $e$ is carried by the plunger mechanism of the glass-press, and its neck $e^4$ is carried in the pressing operation down into the cavity $o$ of the press-collar, while the plunger $f$ passes through the press-ring in the pressing operation.

The removable press-matrix $d$ is carried by the handle $d'$ and is adapted to be passed horizontally into the side opening $a^2$ of the base-plate and guided by the curved inner end $a^3$ into proper position with relation to the press-collar $c$, and with it forms the press-mold, its base resting upon the sliding plate $p$ of the table A and in such position that its top face coincides with the bottom face of the press-collar. It will be noticed that it has a large open mouth the full width of the article to be pressed below the neck portion thereof. This is an important improvement in glass-pressing mechanism, in the fact that a large mouth is provided in the press-matrix, which enables the operator to easily introduce the glass into the same and to accurately measure the glass before it is cut off, as the presser can see when the open-mouthed matrix is filled, and can cut off the glass to the height therein which experience shows is proper, whereas if the glass were introduced through the narrow mouth either of the upper press-mold section $c$ or of the plunger-ring $e$ it would be uncertain whether the proper measure of glass was obtained, this having been the principal reason why such articles are blown to shape. With this open-mouthed press-matrix, however, unskilled labor can be employed for gathering the glass, and in a short time will be able to gather sufficiently well to form perfect articles within the mold. The press-matrix may be formed in a single part or in two sections, the latter being shown in Fig. 9, where the press-matrix is to be opened so as to withdraw it from the press-blank, such as where enlargements of greater diameter than the mouth of the matrix are formed below the same—for example, in articles having bases or collars thereon. In such case the press-matrix $r$ is divided into two sections $r'$ $r^2$, hinged together at $r^3$ and adapted to be closed together and suitably centered with relation to the upper section or collar $c$, which can well be accomplished by forming the base-block $r^4$ with the base-plate and closing the press-matrix around it, and to withdraw the press-matrix it is sufficiently opened to free it from the pressed blank and is withdrawn horizontally and the blow-mold section closed around the base-block.

In order to form a combined pressed article in the mold above described and by the method above indicated, the mold is placed upon the glass-press, resting on the platform thereof, and the upper press-mold section or collar $c$ is closed together and locked, the blow-mold section being left open, and the apparatus is then ready for use. The glass is then gathered on a punty and carried over to the press and is dropped into the press-matrix $d$, and the operator cuts off the glass at the proper point, such open-mouthed press-matrix providing for the measuring of the glass, as above stated, because it provides a wide space in which to drop the glass and let it practically fill the cavity of the press-matrix before cutting it off. The press-matrix is then passed horizontally under the press-collar, or it may be guided to place before the press-collar is closed over it, but as the parts are assembled for the pressing operation the press collar and matrix form the press-mold. The plunger-ring $e$ and the plunger $f$ are then lowered and the article is pressed, and if that completes the article it is only necessary to lower or open the press-matrix and open the press-collar to remove the article. In the pressing operation it will be seen that all the glass is first contained within the press-matrix, but under the pressure of the plunger it is caused to rise around the plunger and fill the mold-cavity $o'$ of the press-collar, being forced up against the plunger-ring $e$, which forms the top of the mold-cavity, and the glass being thus caused to rise from the open-mouthed press-matrix into the narrow neck-mold cavity of the press-collar. During the pressing operation the valve $g$ of the plunger is of course closed. If it is desired to blow the pressed article or blank so formed, such as in the making of salt-cellars, the plunger $f$ is withdrawn, as shown in Fig. 1, to permit the blank to shrink or contract, and the sliding plate $p$ is withdrawn, which will allow the press-matrix to drop from the press-collar, dropping down until its shoulder $d^3$ rests on the top of the base-plate $a$, and the matrix can then be withdrawn horizontally. If a partible press-matrix, such as shown in Fig. 9, is made, the two sections can be opened out, which will free it from the article, and the press-matrix then withdrawn. This leaves the pressed blank $s$ in the press-collar and within the blow-mold section, and the operator then inserts the base-block $m'$, guiding it to place by its guide portion $m^2$ and its shoulder $m^3$, resting upon the top of the base-plate, and he then closes the blow-mold around the same. The plunger $f$ having been previously withdrawn until its lower end is just beyond the collar of the pressed blank $s$ to permit said collar to contract or shrink, air under pressure is admitted by the pipe $e^3$ into the passage $f'$ of the plunger, and the article is thus expanded within the blow-mold. The valve $g$ is opened either by gravity or the pressure of the air. The blow-mold section and press-collar are then opened and the article withdrawn.

Where the press-matrix is in two sections, as in Fig. 9, it is placed within the blow-mold section and closed around the base-block, the glass is gathered and fed thereto and cut off, the upper section or collar closed around it, and the article or blank pressed, and the press-matrix is then opened and withdrawn horizontally, and if the blank is to be blown the blow-mold section is closed around the blank fitting around the base-block and the article blown to shape in the manner described.

Instead of introducing the air through the plunger, a separate blowpipe may be introduced into the upper press-mold section, as shown in Fig. 8. I thus provide for the combined pressing and blowing operations within the same apparatus and within the blow-mold, which is centered and guided to place by the operator and is quickly formed around the article after it is pressed, and I am enabled, therefore, to rapidly form combined pressed and blown articles within the same molding apparatus. I am also enabled to form such articles with very narrow necks or mouths and to form perfectly-molded top edges to such necks or mouths; and I provide an apparatus which can be operated by unskilled labor and in which the glass can be easily measured for pressing, while there is positive guiding means between the press-collar and blow-mold section which will always bring them into the proper line and insure the formation of perfect-blown articles.

What I claim as my invention, and desire to secure by Letters Patent, is—

1. The combination in a glass-mold, of a partible blow-mold and a partible upper press-mold section mounted above the same, both being mounted on the same shaft, and a removable press-matrix adapted to be inserted horizontally under the upper press-mold section and within the blow-mold when opened, substantially as set forth.

2. The combination of a base-plate having a side opening therein, and having a shaft, a partible blow-mold section mounted on said shaft, a partible upper press-mold section mounted on said shaft above the blow-mold section, a removable press-matrix adapted to be inserted horizontally under the upper section through the side opening and within the blow-mold when opened, and dropped therefrom, and a base-block for the blow-mold adapted to be inserted through the side opening of the base-plate and forming the base to the blow-mold when closed, substantially as set forth.

3. The combination of a base-plate having a side opening therein, and having a shaft, and a partible blow-mold hinged thereon, a partible upper press-mold section hinged on said shaft above the blow-mold, a removable press-matrix adapted to be inserted under the press-collar within the blow-mold when opened and removed therefrom, a base-block for the blow-mold adapted to be inserted through the side opening of the base-plate and having a shoulder resting on the base-plate, and forming the base to the blow-mold when closed, substantially as set forth.

4. The combination of a base-plate having a side opening and a shaft, a partible blow-mold section mounted thereon, a partible upper press-mold section mounted on said shaft above the blow-mold, and a removable press-matrix insertible under the upper section within the side opening of the base-plate and adapted to drop therein, and having the shoulder $d^3$ limiting the downward motion of the matrix, substantially as set forth.

In testimony whereof I, the said JULIUS PROEGER, have hereunto set my hand.

JULIUS PROEGER.

Witnesses:
 ROBERT C. TOTTEN,
 CHAS. J. FARRAR.